(12) United States Patent
Imanishi et al.

(10) Patent No.: US 7,543,435 B2
(45) Date of Patent: Jun. 9, 2009

(54) MOWER UNIT

(75) Inventors: Ryouzou Imanishi, Kishiwada (JP);
Tomoyuki Morikawa, Takatsuki (JP);
Katsuhiko Uemura, Sakai (JP);
Nobuyuki Yamashita, Izumi (JP);
Kazuaki Kurohara, Sakai (JP); Hiroshi Oshima, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/854,229

(22) Filed: Sep. 12, 2007

(65) Prior Publication Data
US 2008/0086998 A1 Apr. 17, 2008

(30) Foreign Application Priority Data
Oct. 16, 2006 (JP) .............................. 2006-281184

(51) Int. Cl.
*A01D 67/00* (2006.01)
(52) U.S. Cl. ........................................... 56/320.1; 56/6
(58) Field of Classification Search ...................... 56/6, 56/320.1, 320.2
See application file for complete search history.

(56) References Cited
U.S. PATENT DOCUMENTS

| | | | |
|---|---|---|---|
| 4,226,074 A * | 10/1980 | Mullet et al. | ............... 56/320.2 |
| 5,035,108 A | 7/1991 | Meyer et al. | |
| 5,210,998 A | 5/1993 | Hojo et al. | |
| 5,305,589 A * | 4/1994 | Rodriguez et al. | ......... 56/320.1 |
| 5,465,564 A * | 11/1995 | Koehn et al. | ................ 56/320.2 |
| 5,894,717 A * | 4/1999 | Yamashita et al. | ......... 56/320.1 |
| 6,065,276 A | 5/2000 | Hohnl et al. | |
| 6,073,430 A * | 6/2000 | Mullet et al. | .................. 56/13.4 |
| 6,192,666 B1 | 2/2001 | Sugden et al. | |
| 6,360,517 B1* | 3/2002 | Ishimori et al. | ............ 56/320.1 |

FOREIGN PATENT DOCUMENTS

JP 2001045828 2/2001

* cited by examiner

*Primary Examiner*—Alicia M Torres
(74) *Attorney, Agent, or Firm*—The Webb Law Firm

(57) ABSTRACT

A mower unit includes a housing, a pair of cutting blades arranged inside the housing, each of the cutting blades being rotatable about a respective vertical axis supported by the housing, the cutting blades being driven to be rotated in opposite directions, and a baffle arranged generally between rotation regions of the cutting blades to guide air flows generated by the cutting blades. The baffle defines an upper baffle portion located adjacent an upper region of the housing, a lower baffle portion located adjacent a lower region of the housing, and an air passage formed for allowing the air flows to flow between the upper baffle portion and lower baffle portion.

7 Claims, 10 Drawing Sheets

MOWER UNIT

BACKGROUND OF THE INVENTION

This invention relates to a mower unit. Such a mower unit has a housing, and a pair of cutting blades arranged in the housing to be rotatable, respectively, about vertical axes supported by the housing. The pair of cutting blades are driven to rotate in opposite directions.

A conventional mower unit as noted above is disclosed in JP 2001-45828, for example. The mower unit shown in this document has three blades arranged transversely in a housing, and a vacuum plate located forwardly of the three blades. Of the three blades, the blade located in the middle and the blade located at right-hand side are driven to rotate in opposite directions. The vacuum plate has a curved discharge portion extending to a region between a rotation region of the middle blade and a rotation region of the right-hand blade. The curved discharge portion serves as a baffle for the middle blade and right-hand blade acting as a pair of rotary cutting blades, to guide winds flowing from the middle blade and right-hand blade. The length of the curved discharge portion lying between the rotation regions is substantially the same over a full length (total height) of the curved discharge portion in the vertical direction of the blade housing.

In a mower unit having a pair of rotary cutting blades arranged transversely of a blade housing to be rotatable in opposite directions, a grass discharge opening may be formed at one lateral end of the blade housing to enable a side discharge operation. The grass discharge opening may be closed, or may not be formed at one lateral end of the blade housing, to enable a mulching operation. That is, with the grass discharge opening formed, a side discharge operation can be carried out to discharge grass clippings cut by each rotary cutting blade from the lateral end of the blade housing to areas laterally outward of the mower unit. With the grass discharge opening closed, or not formed at one lateral end of the blade housing, a mulching operation can be carried out to discharge grass clippings cut by each rotary cutting blade from the bottom of the blade housing to areas below the mower unit. In this case, when the conventional technique relating to the baffle is employed, the side discharge operation is liable to low efficiency of discharging grass clippings to areas laterally outward of the mower unit, or the mulching operation is liable to low efficiency of shredding and dispersing grass clippings.

In the case of side discharge operation, the grass clippings cut by the rotary cutting blade far from the grass discharge opening, of the pair of rotary cutting blades, join the grass clippings cut by the rotary cutting blade near the grass discharge opening, to be discharged together from the grass discharge opening. For this purpose, the grass clippings cut by the rotary cutting blade far from the grass discharge opening should desirably flow smoothly into the rotation region of the rotary cutting blade near the grass discharge opening. In the case of mulching operation, it is desirable that the grass clippings cut by each rotary cutting blade circulate in the rotation region of the rotary cutting blade, so that the grass clippings may be shredded by each rotation cutting blade and discharged below the rotation region of the rotary cutting blade.

However, in the case of side discharge operation, to make it easy for the grass clippings produced in the rotation region of the rotary cutting blade far from the grass discharge opening to flow into the rotation region of the rotary cutting blade near the grass discharge opening, it is necessary to reduce the length of the baffle extending into the space between the rotation regions so that the baffle may not obstruct the inflow.

Then, in time of mulching operation, the wind from each rotary cutting blade flows toward the rotation region of the other rotary cutting blade in locations spaced from the baffle. The winds from the rotary cutting blades join in a location where the two rotation regions communicate. Thus, the grass clippings cut by each rotary cutting blade can hardly circulate in the rotation region of the rotary cutting blade.

On the other hand, in the case of mulching operation, to make it easy for the wind from each rotary cutting blade to flow separately toward the rotation region of that rotary cutting blade also in the location spaced from the baffle, and for the grass clippings cut by each rotary cutting blade to circulate in the rotation region of that rotary cutting blade, it is necessary to increase the length of the baffle extending into the space between the rotation regions so that the baffle may guide the winds reliably. Then, in time of side discharge operation, the grass clippings cut by the rotary cutting blade far from the grass discharge opening will have difficulty in flowing into the rotation region of the rotary cutting blade near the grass discharge opening.

SUMMARY OF THE INVENTION

The object of this invention is to solve at least part of the above problem of the prior art.

A mower unit according to this invention comprises:

a housing;

a pair of cutting blades arranged inside the housing, each of the cutting blades being rotatable about a respective vertical axis supported by the housing, the pair of cutting blades being driven to be rotated in opposite directions; and a baffle arranged generally between rotation regions of the pair of cutting blades to guide air flows generated by the pair of cutting blades, the baffle defining an upper baffle portion located adjacent an upper region of the housing, a lower baffle portion located adjacent a lower region of the housing, and an air passage formed for allowing the air flows to flow between the upper baffle portion and the lower baffle portion.

Thus, even if winds and grass clippings from each rotary cutting blade deviate from the baffle, the upper baffle portion and lower baffle portion guide the winds and grass clippings to flow toward the rotation region of each rotary cutting blade. Consequently, the winds and grass clippings flow in one rotation region and the other rotation region separately. The winds from one rotary cutting blade easily pass through the air passage to flow into the rotation region of the other rotary cutting blade, to allow the grass clippings from one rotary cutting blade to flow into the rotation region of the other rotary cutting blade. Where no grass discharge opening is provided at one lateral end of the blade housing, there is little chance of pressure difference occurring between the pair of rotation regions. Thus, in spite of the air passage, the winds from each rotary cutting blade, after deviating from the baffle, can easily return to the rotation region of each rotary cutting blade.

To enable a side discharge operation, grass clippings cut by the rotary cutting blade far from the grass discharge opening are made to join smoothly the grass clippings cut by the rotary cutting blade near the grass discharge opening. Thus, the operation may be carried out conveniently, with the grass clippings from each rotary cutting blade reliably discharged to areas laterally outward of the mower to facilitate collection of the grass clippings. To enable a mulching operation, the grass clippings cut by each rotary cutting blade are circulated in the rotation region of each rotary cutting blade. In this state, the grass clippings are shredded by each rotary cutting blade, and discharged under the mower as uniformly distributed transversely of the mower. Thus, the operation is carried out to produce a good finish.

DETAILED DESCRIPTION OF PREFERRED EMBODIMENTS

An embodiment of this invention will be described hereinafter with reference to the drawings.

Figure 1:
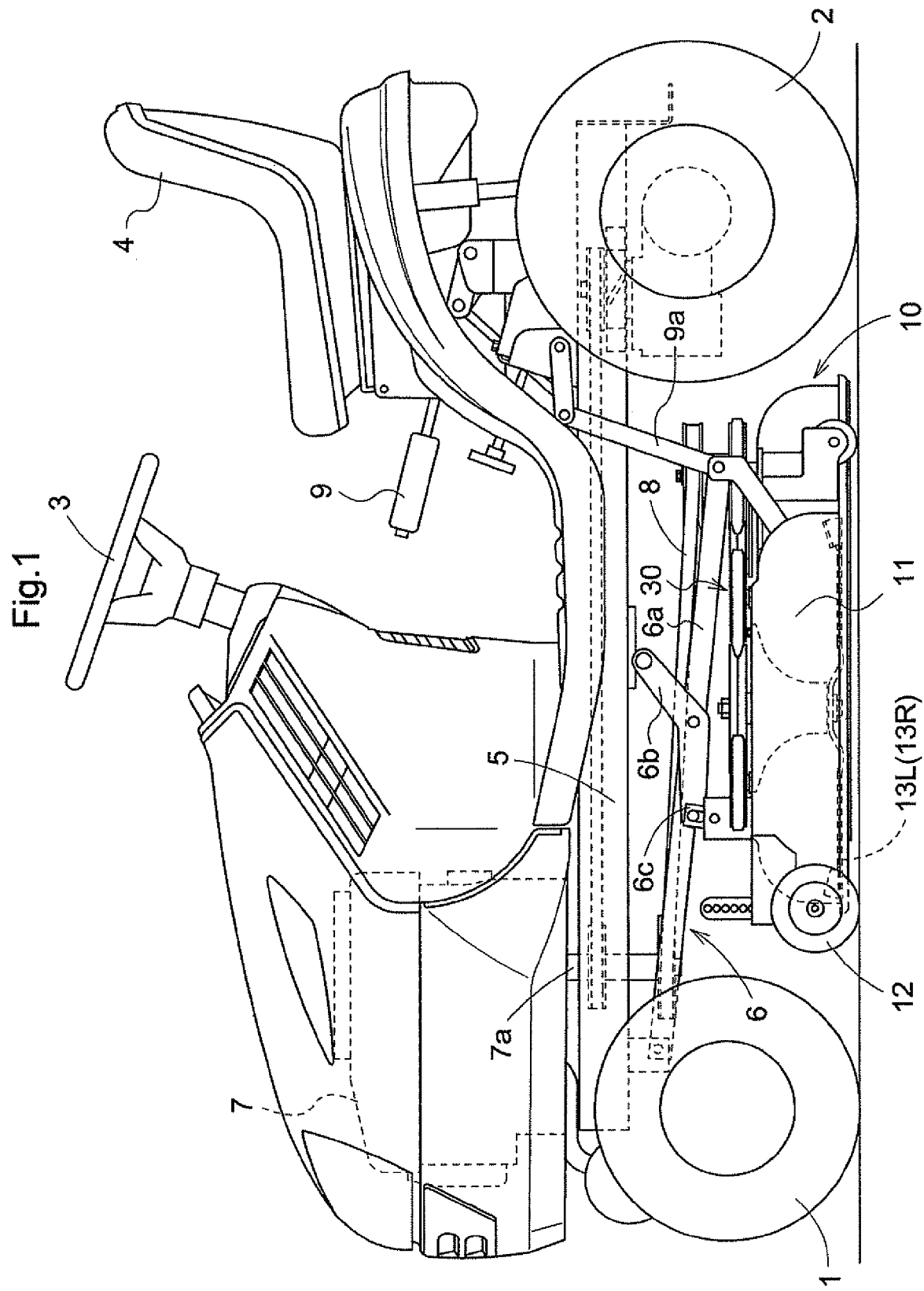
FIG. 1 is a side elevation of a riding type grass mower.

FIG. 1 shows a side elevation of a riding type grass mower with a mower unit 10 embodying this invention. As seen, the riding type grass mower has a self-propelled vehicle body with a pair of right and left dirigible front wheels 1 and a pair of right and left rear drive wheels 2, and a driving platform including a steering wheel 3 and a driver's seat 4. The mower unit 10 embodying this invention is connected to a body frame 5 of the self-propelled vehicle body between the front and rear wheels through a link mechanism 6. The vehicle body has an engine 7 mounted in a front position thereof. The engine 7 has a vertical output shaft 7a, and its output is transmitted by a transmission belt 8 to a blade drive mechanism 30 of the mower unit 10. The link mechanism 6 includes lift links 6a connected to forward positions of the vehicle body frame 5 and rear end positions of a blade housing 11 of the mower unit 10, rocking links 6b connected to intermediate positions of the lift links 6a and the vehicle body frame 5, and connecting links 6c connected to ends of the rocking links 6b and forward end positions of the blade housing 11. A lift lever 9 is interlocked to the rear ends of the lift links 6a through an interlocking mechanism 9a. When the lift lever 9 is rocked vertically, the lift links 6a are rocked vertically relative to the body frame 5 to raise or lower the rear end of the mower unit 10 relative to the body frame 5. The vertical rocking movement of the lift links 6a rocks the rocking links 6b vertically relative to the body frame 5 to raise or lower the front end of the mower unit 10 relative to the body frame 5.

The riding type grass mower is designed for grass cutting operation.

That is, by vertically rocking the lift lever 9, the link mechanism 6 is rocked vertically relative to the body frame 5, to lower the mower unit 10 to a downward, operative state with a pair of right and left gauge wheels 12 of the mower unit 10 contacting the ground, or raises the mower unit 10 to an upward, inoperative state with the gauge wheels 12 raised high above the ground. When the self-propelled vehicle body moves with the mower unit 10 placed in the downward, operative state, the mower unit 10 rotates two rotary cutting blades 13L and 13R of located inside the blade housing 11, through the blade drive mechanism 30, to cut lawn or grass (hereinafter simply called grass) with the rotary cutting blades 13L and 13R. The mower unit 10 carries out a side discharge operation for discharging cut lawn or grass clippings (hereinafter simply called grass clippings) from the rotary cutting blades 13L and 13R laterally outward of the mower through one lateral end of the blade housing 11, or a mulching operation for discharging grass clippings from the rotary cutting blades 13L and 13R below the mower through the bottom of the blade housing 11.

Figure 2:
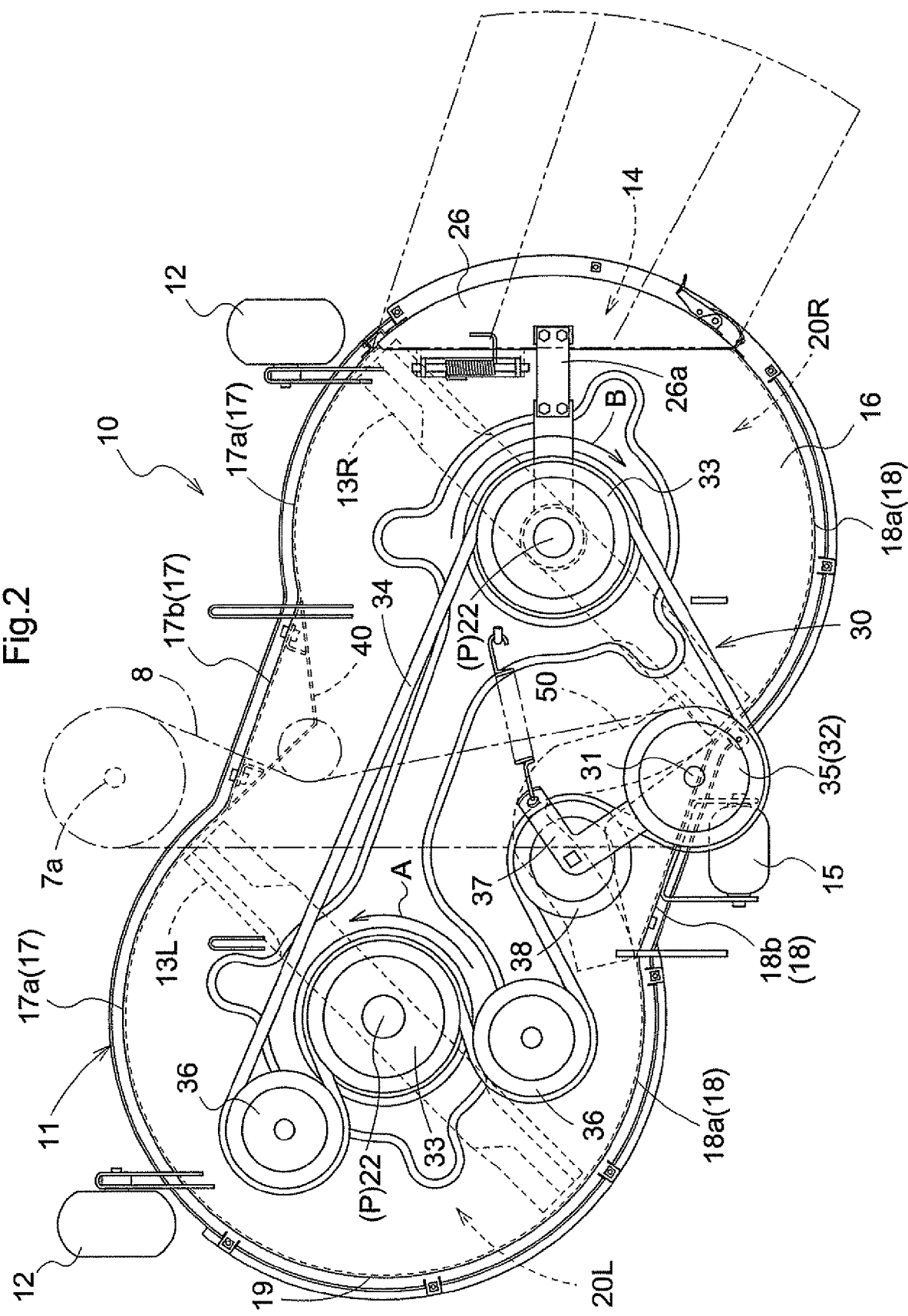
FIG. 2 is a plan view of a mower unit in a mulching operation.
Figure 3:
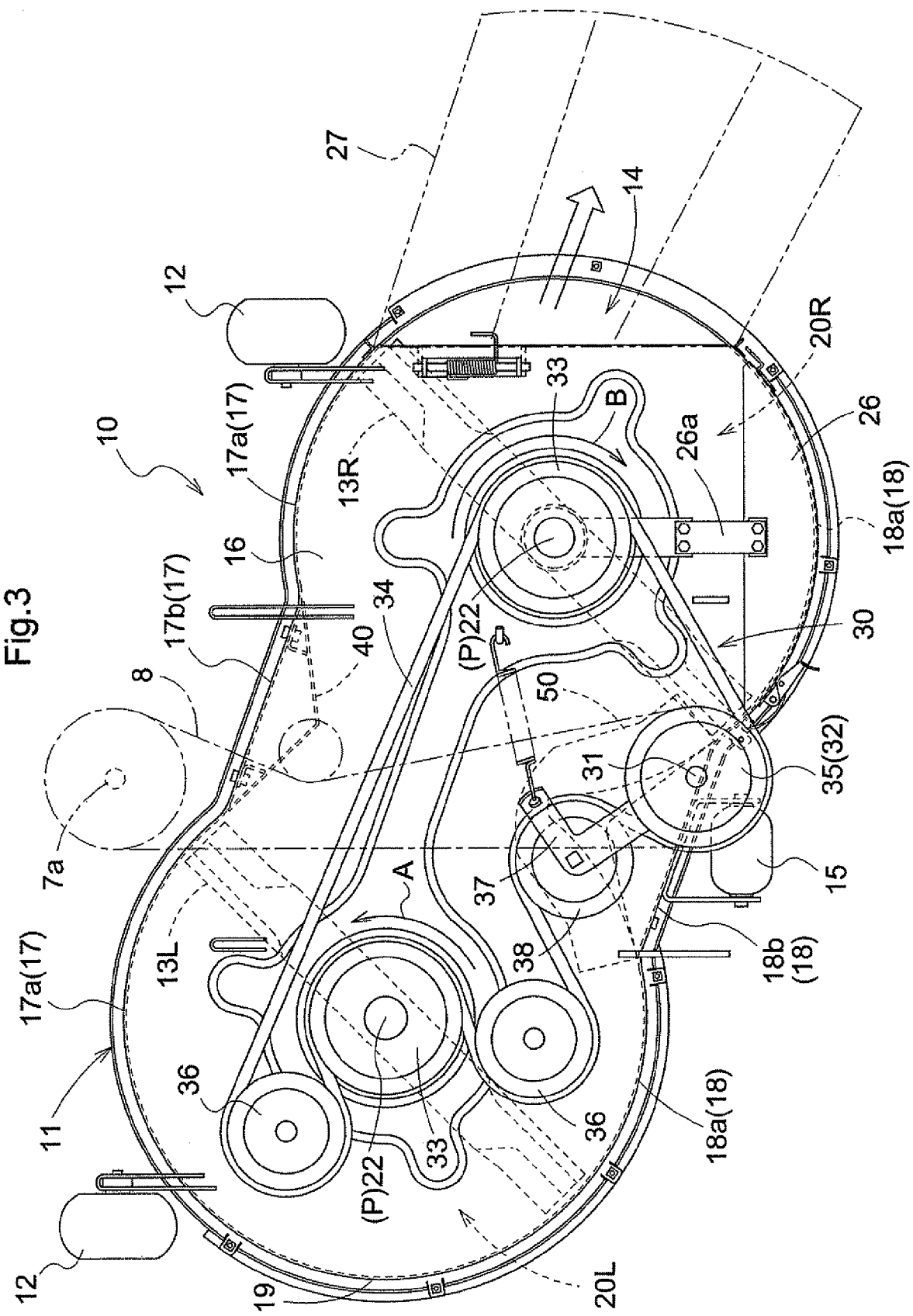
FIG. 3 is a plan view of the mower unit in a side discharge operation.
Figure 4:
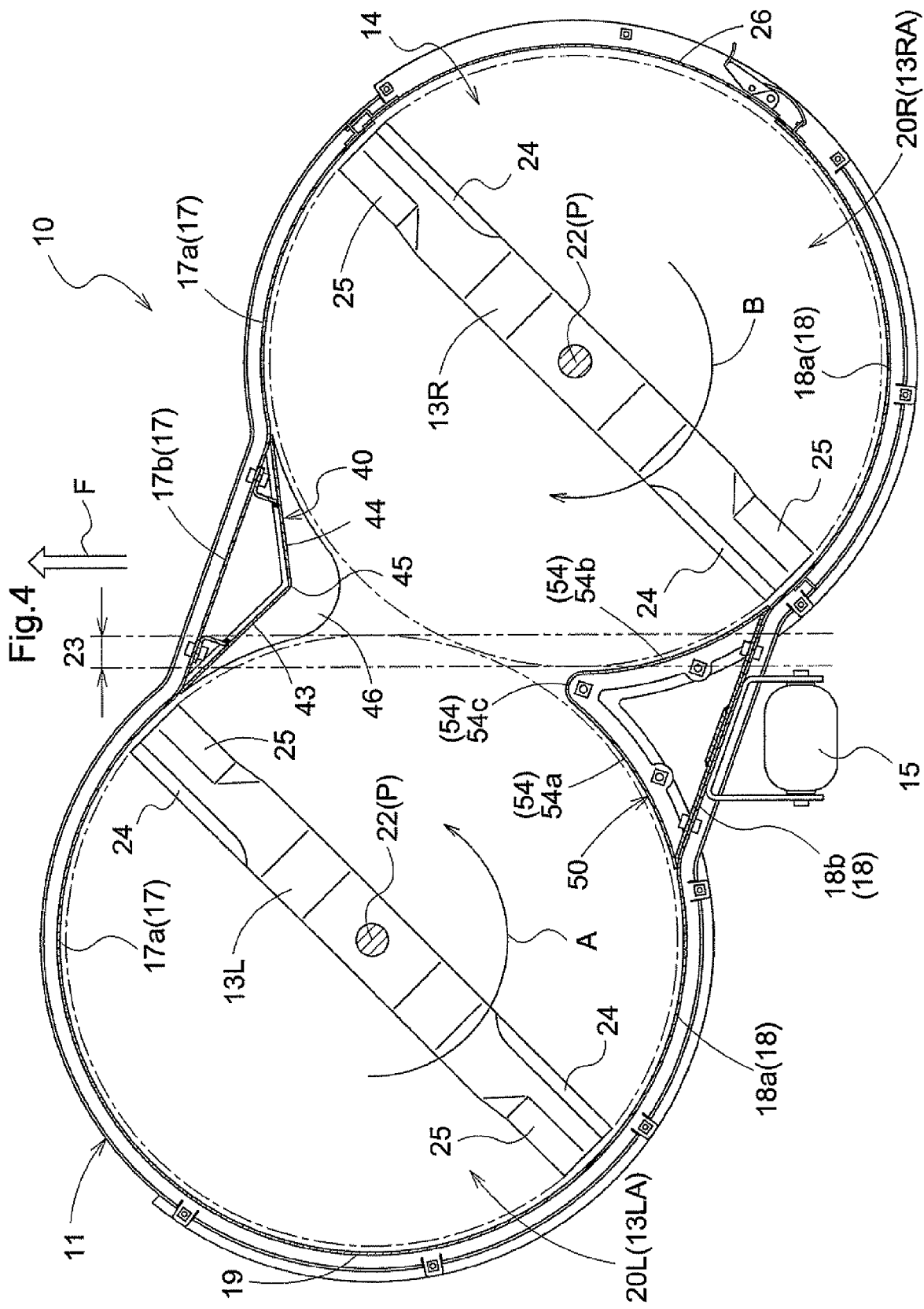
FIG. 4 is a plan view of the mower unit with a top board removed.

Next, the mower unit 10 will be described in greater detail, FIG. 2 is a plan view of the mower unit 10 in a mulching operation. FIG. 3 is a plan view of the mower unit 10 in a side discharge operation. FIG. 4 is a plan view of the mower unit 10 with a top board removed. As shown in these figures, the mower unit 10 includes, besides the blade housing 11, blade drive mechanism 30, two rotary cutting blades 13L and 13R, and the pair of right and left gauge wheels 12, which are distributed to laterally opposite end positions at the front of the blade housing 11, an obstacle riding roller 15 disposed in a transversely middle position rearwardly outward of the blade housing 11.

Figure 5:
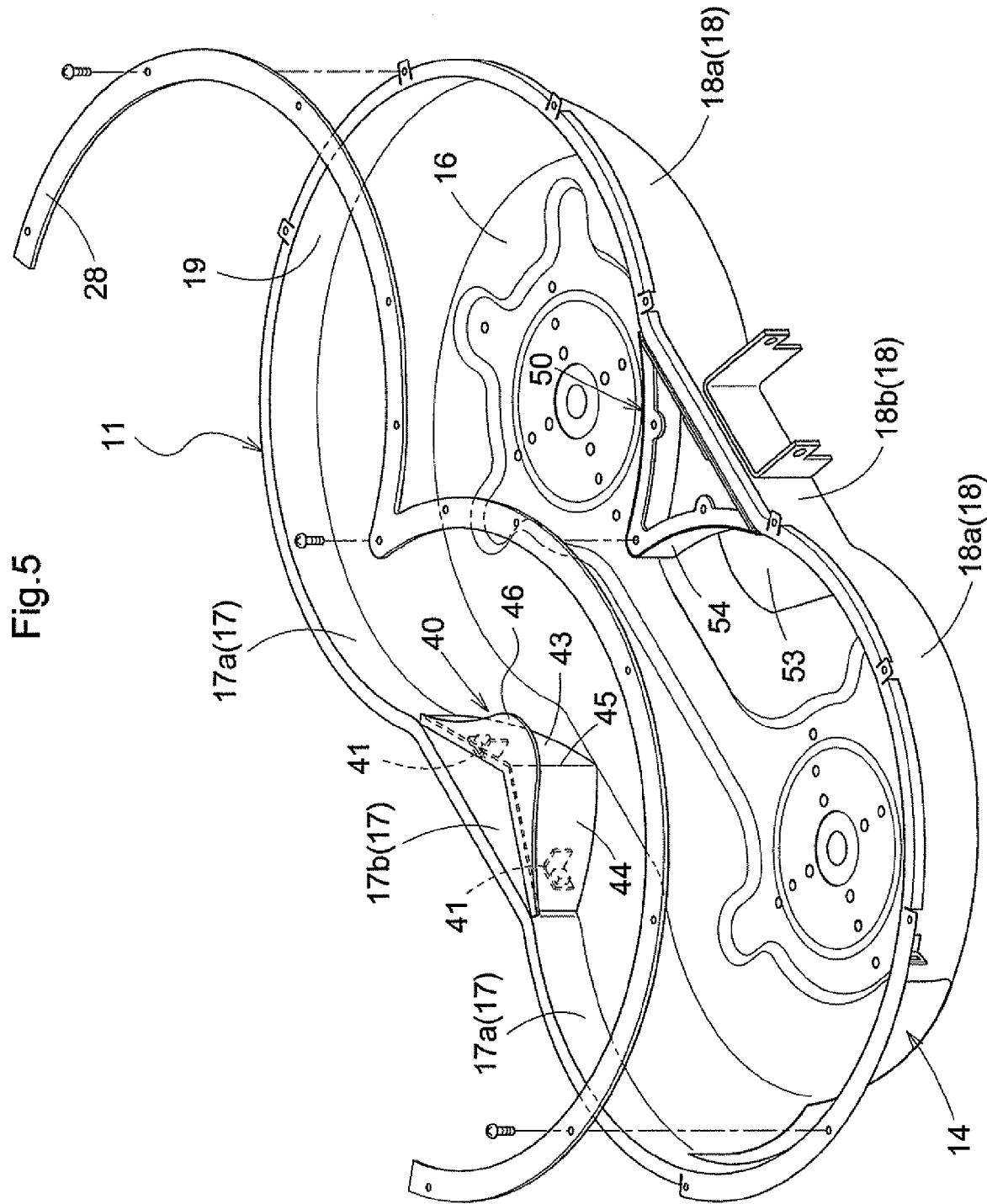
FIG. 5 is a perspective view of a blade housing.

FIG. 5 is a perspective view seen from the bottom of the blade housing 11. As shown in this figure and FIGS. 2 and 4, the blade housing 11 includes a top board 16, and a front wall 17, a rear wall 18 and a side wall 19 extending downward from peripheries of the top board 16, to define a pair of cutting chambers 20L and 20R arranged transversely of the blade housing 11. The front wall 17 has a pair of front arc wall portions 17a extending along outer front circumferences of rotation regions 13LA and 13RA of the rotary cutting blades 13L and 13R, and a front straight wall portion 17b interconnecting the front arc wall portions 17a. The rear wall 18 has a pair of rear arc wall portions 18a extending along outer rear circumferences of the rotation regions 13LA and 13RA of the rotary cutting blades 13L and 13R, and a rear straight wall portion 18b interconnecting the rear arc wall portions 18a. The side wall 19 has an arcuate shape extending along an outer lateral circumference of the rotation region 13LA of one rotary cutting blade 13L. The pair of cutting chambers 20L and 20R are slightly staggered in the fore and aft direction of the blade housing 11, and communicate with each other in a transversely middle portion of the blade housing 11. The cutting chambers 20L and 20R open downward at the bottom of the blade housing 11. Of the pair of cutting chambers 20L and 20R, the cutting chamber 20R located slightly rearward in the blade housing has a grass discharge opening 14 formed in the lateral end thereof remote from the other cutting chamber 20L. A rim 28 shown in FIG. 5 is attached to the blade housing 11 to extend along the lower edge of the rear wall 18.

Figure 6:
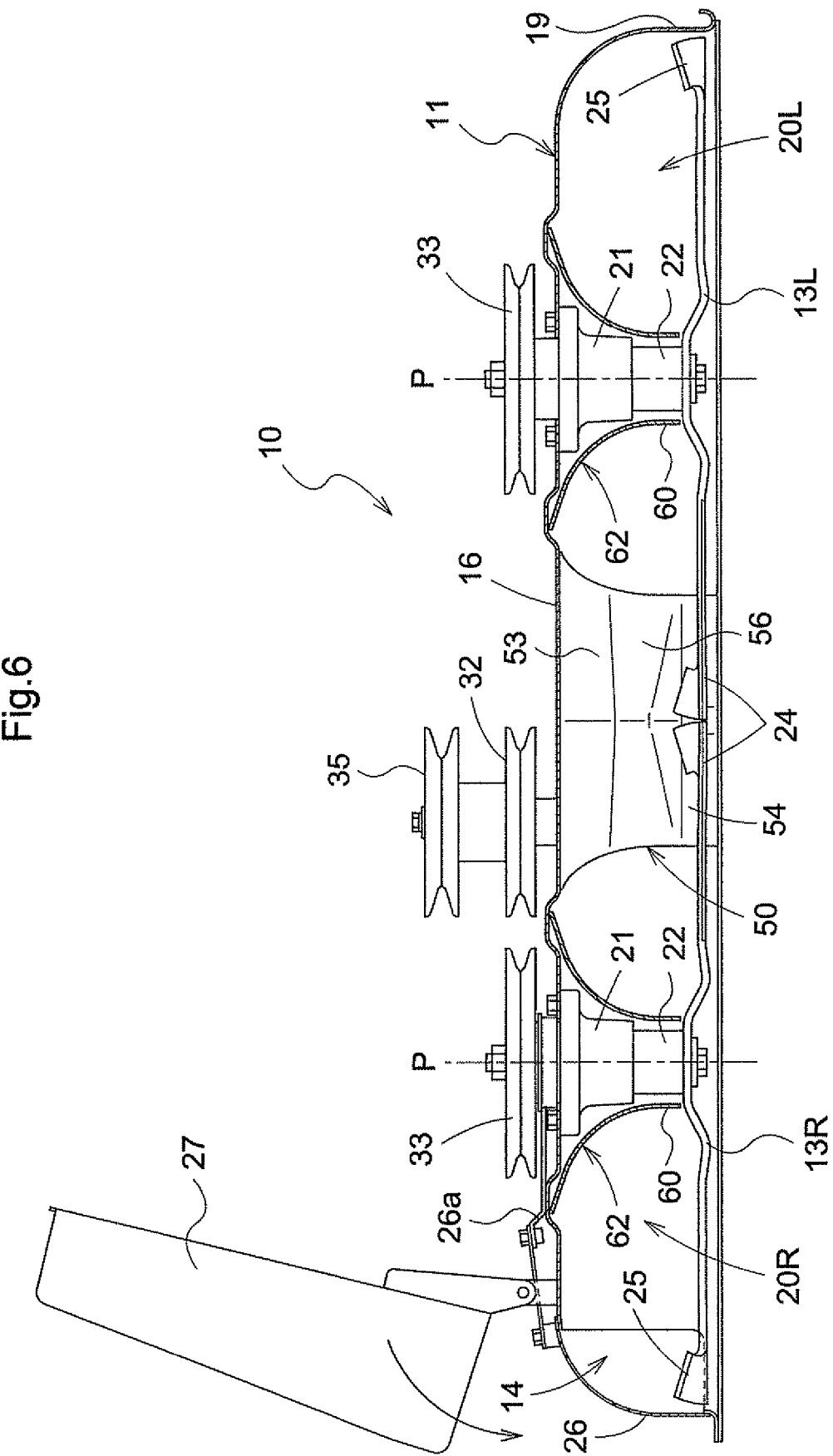
FIG. 6 is a front view in vertical section of the mower unit.

As shown in FIGS. 4 and 6, one rotary cutting blade 13L of the two rotary cutting blades 13L and 13R is located in one cutting chamber 20L of the pair of cutting chambers 20L and 20R, while the other rotary cutting blade 13R is located in the cutting chamber 20R. Each of the rotary cutting blades 13L and 13R is attached to, to be rotatable with, a lower end of a rotary support shaft 22 rotatably supported by the top board 16 through a bearing holder 21. That is, each of the rotary cutting blades 13L and 13R is rotatable with the rotary support shaft 22 about a vertical axis of the rotary support shaft 22. The two rotary cutting blades 13L and 13R are arranged transversely of the blade housing 11 as slightly staggered in the fore and aft direction of the blade housing 11. An overlap region 23 is formed where the rotation region 13LA of one rotary cutting blade 13L and the rotation region 13RA of the rotary cutting blade 13R overlap each other as seen in the fore and aft direction of the blade housing 11. Each rotary cutting blade 13L or 13R has cutting edges 24 formed on opposite end regions of the rotary cutting blade 13L or 13R, and wind-generating vanes 25 formed behind the respective cutting edges 24.

FIG. 2 shows a plan view of the construction of the blade drive mechanism 30. FIG. 6 shows a front view of the construction of the blade drive mechanism 30. As shown in these figures, the blade drive mechanism 30 includes an input shaft 31 rotatably supported in vertical posture by a rear end portion of the top board 16, a transmission pulley 32 supported by the input shaft 31 to be rotatable therewith, blade drive pulleys 33 supported by the rotary support shafts 22 of the respective rotary cutting blades 13L and 13R to be rotatable therewith, and a transmission belt 34 wound around the transmission pulley 32 and blade drive pulleys 33. The input shaft 31 has an input pulley 35 mounted thereon above the transmission pulley 32, to be rotatable together, with the transmission belt 8 wound around the input pulley 35. The transmission belt 34 is wound also around a guide pulley 36 rotatably supported by the top board 16, and a tension pulley 38 supported by the input shaft 31 through a tension arm 37.

That is, in the blade drive mechanism 30 drive is transmitted from the engine 7 through the transmission belt 34 to the input pulley 35 to drive the input shaft 31. The drive is then transmitted to each blade drive pulley 33 to rotate each rotary support shaft 22, thereby to rotate each of the rotary cutting blades 13L and 13R. One rotary cutting blade 13L is driven to rotate a direction A (see FIG. 4) about the axis P of the rotary support shaft 22. The other rotary cutting blade 13R is driven to rotate about the axis P of the rotary support shaft 22 in a direction B (see FIG. 4) opposite to the direction of rotation A of the one rotary cutting blade 13L.

As shown in FIGS. 2, 3, and 6, the blade housing 11 has a lid 26 disposed at the lateral end where the grass discharge opening 14 is formed. The lid 26 is supported by a support arm 26a rockably extending from the rotary support shaft 22 of the rotary cutting blade 13R. The lid 26 is movable with the support arm 26a to open and close the grass discharge opening 14. As shown in FIGS. 2 and 6, the blade housing 11 has a discharge guide 27 supported by the top board 16 near the grass discharge opening 14. The discharge guide 27 is vertically rockable supported, and when switched to a downward operative position, guides grass clippings discharged from the grass discharge opening 14 to and disperse the grass clippings laterally outward.

Figure 8:
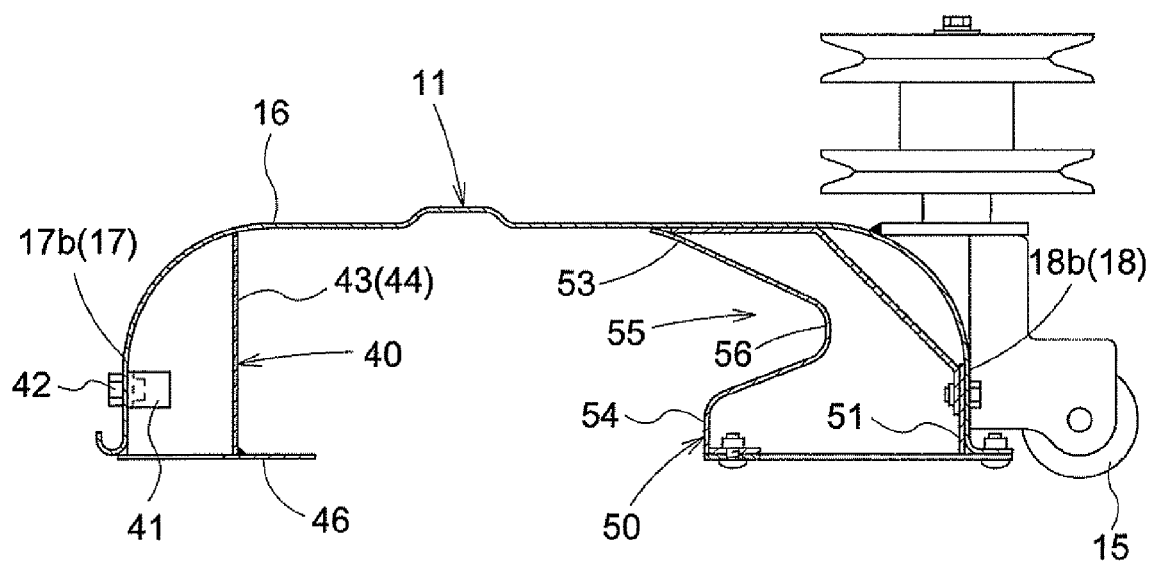
FIG. 8 is a side view in vertical section of the blade housing.
Figure 9:
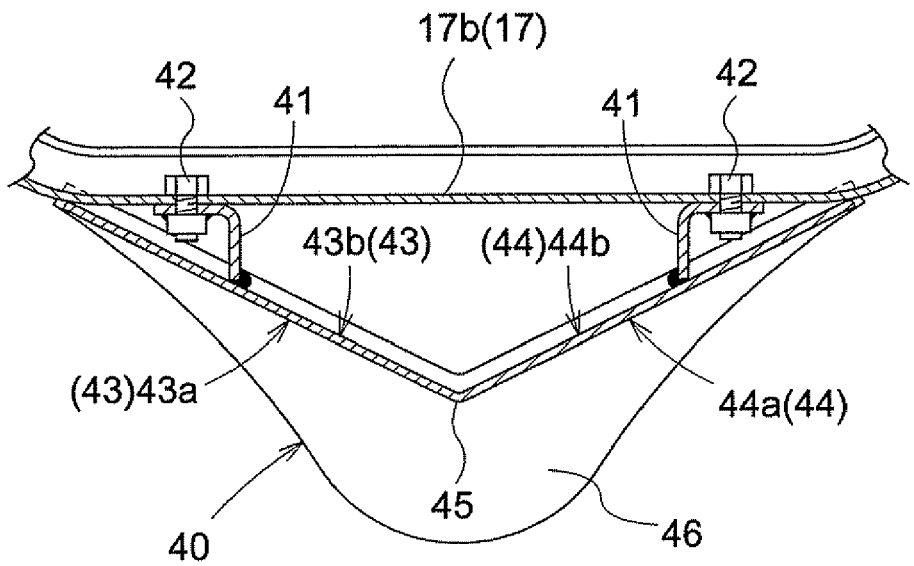
FIG. 9 is a plan view in cross section of a front baffle.

As shown in FIGS. 4 and 5, the blade housing 11 has a front baffle 40 disposed therein forwardly of the pair of rotary cutting blades 13L and 13R. FIG. 4 shows the construction of the front baffle 40 in plan view. FIG. 5 shows the construction of the front baffle 40 in perspective. FIG. 8 shows the construction of the front baffle 40 in vertical section. FIG. 9 is a view in cross section of the front baffle 40. As shown in these figures, the front baffle 40 is formed of a bent plate connected to the front straight wall portion 17b by means of mounting brackets 41 connected to upper end positions of the front baffle 40, and connecting bolts 42 fastening the mounting brackets 41 to the front straight wall portion 17b. The front baffle 40 has a one side portion 43 located adjacent one end thereof transversely of the blade housing 11, an other side portion 44 located adjacent the other end transversely of the blade housing 11, and a bend point defining a boundary 45 between the one side portion 43 and other side portion 44.

The one side portion 43 is smoothly continuous with an inner surface of the front arc wall portion 17a of the cutting chamber 20L not having the grass discharge opening 14, and defines a flat guide surface 43a opposed to the rotation region 13LA of the rotary cutting blade 13L disposed in the cutting chamber 20L. The guide surface 43a guides winds from the rotary cutting blade 13L to flow toward the rotation region 13LA. The other side portion 44 is smoothly continuous with an inner surface of the front arc wall portion 17a of the cutting chamber 20R having the grass discharge opening 14, and defines a flat guide surface 44a opposed to the rotation region 13RA of the rotary cutting blade 13R disposed in the cutting chamber 20R. The guide surface 44a guides winds from the rotary cutting blade 13R to flow toward the rotation region 13RA. The one side portion 43 has a pressing surface 43b formed on the reverse side of the guide surface 43a and extending at an angle to the fore and aft direction of the blade housing 11. The boundary 45 is offset from the overlap region 23 sideways toward the lateral end of the blade housing 11 where the grass discharge opening 14 is formed. Thus, the end of the pressing surface 43b transversely of the blade housing 11, i.e. the end adjacent the boundary 45, is offset from the overlap region 23 sideways toward the lateral end of the blade housing 11 where the grass discharge opening 14 is formed.

The front baffle 40 has a bottom plate 46 extending from the lower end of the front baffle 40 rearwardly in the blade housing 11.

That is, the front baffle 40, with the pressing surface 43b of the one side portion 43, pushes grass that is about to enter the overlap region 23, away from the overlap region 23 toward the lateral end of the blade housing 11. The bottom plate 46 presses down the grass having passed the one side portion 43 to maintain the grass in a prostrate state to which the grass has been pressed by the one side portion 43.

Figure 10:
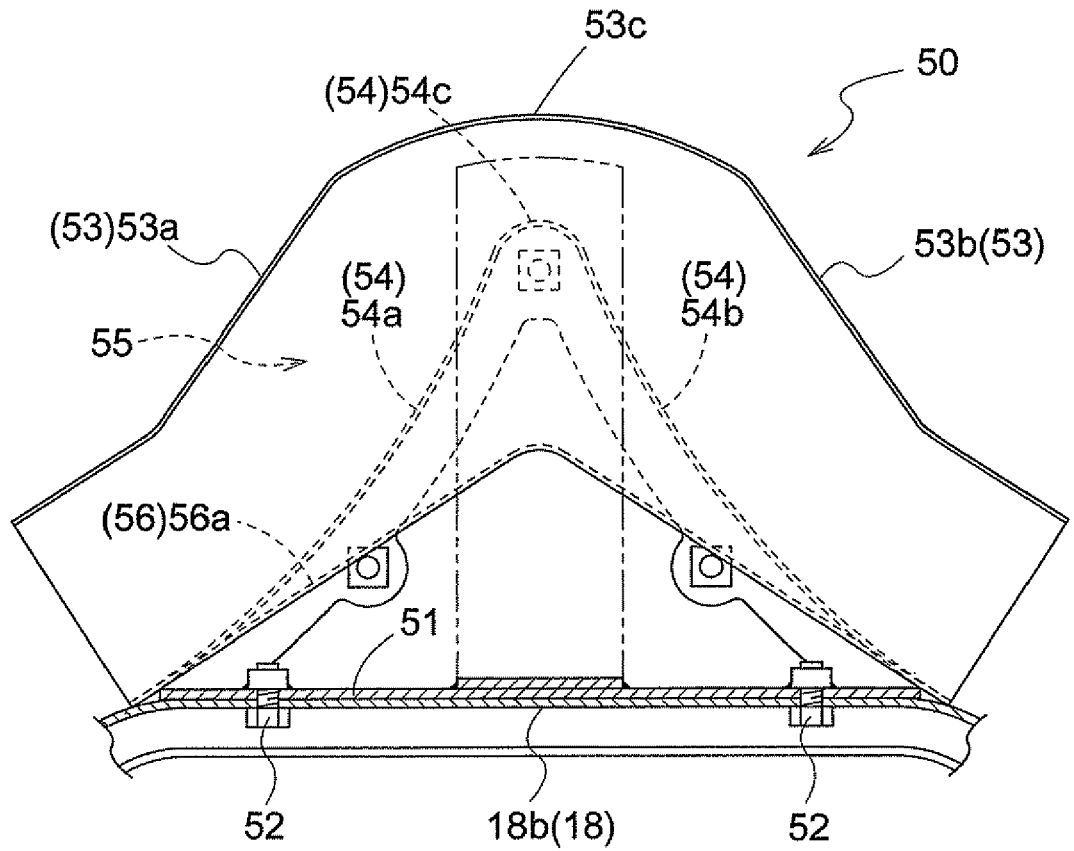
FIG. 10 is a plan view of a rear baffle.
Figure 11:
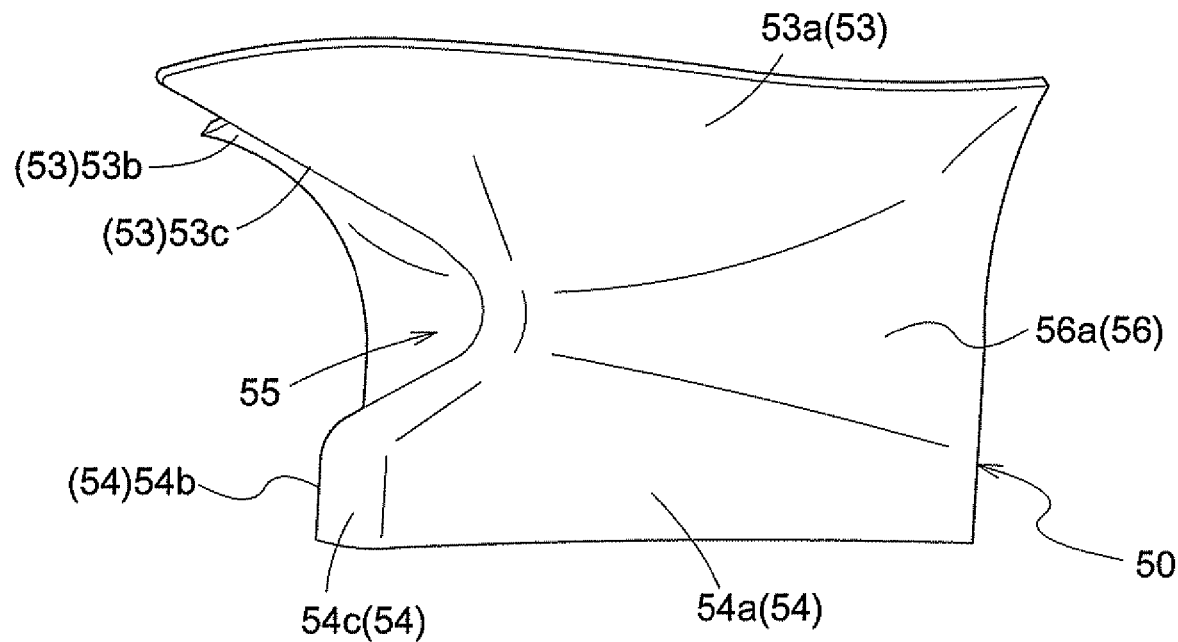
FIG. 11 is a perspective view of the rear baffle.
Figure 12:
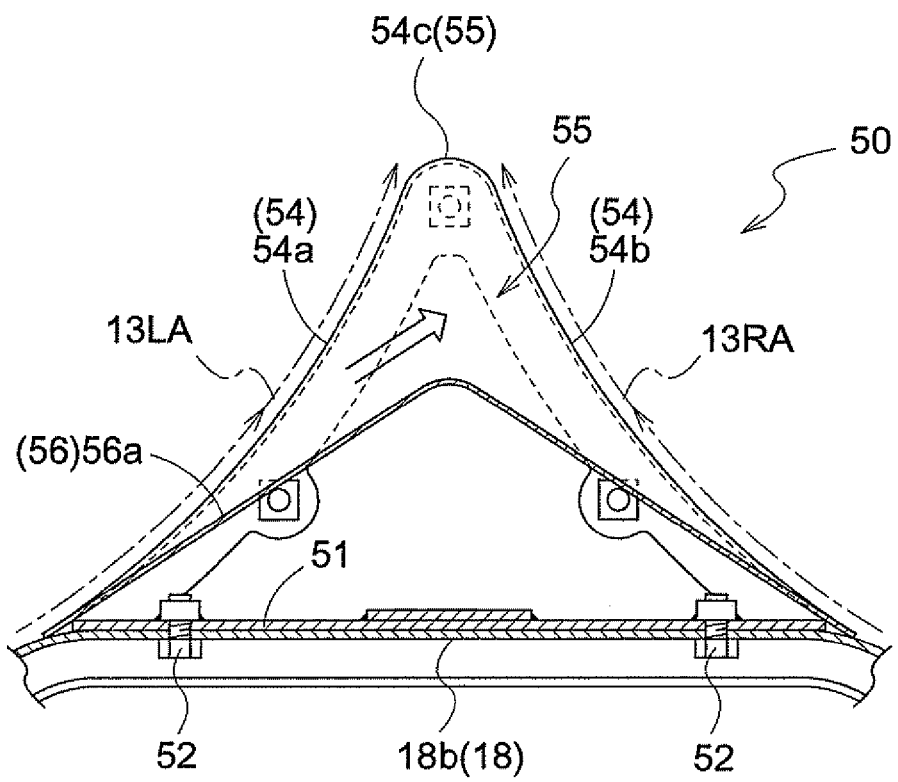
FIG. 12 is a plan view in cross section of the rear baffle.

As shown in FIGS. 4 and 5, the blade housing 11 has a rear baffle 50 disposed therein between rearward portions of the pair of rotation regions 13LA and 13RA. FIG. 5 shows the construction of the rear baffle 50 in perspective. FIG. 8 shows the construction of the rear baffle 50 in vertical section. FIG. 10 is a plan view of the rear baffle 50. FIG. 11 is a perspective view of the rear baffle 50. FIG. 12 is a plan view in cross section of the rear baffle 50. As shown in these figures, the rear baffle 50 is formed of a structure connected to the rear straight wall portion 18b through a mounting bracket 51 connected to the inside of the rear baffle 50 and connecting bolts 52 connecting the mounting bracket 51 to the rear straight wall portion 18b. The structure includes an upper baffle portion 53 disposed adjacent the upper end of the blade housing 11 to have an upper end level with an inner surface of the top board 16, a lower baffle portion 54 disposed adjacent the lower end of the blade housing 11 to have a lower end level with the lower end of the blade housing 11, and an air passage 55 formed between the lower baffle portion 54 and upper baffle portion 53.

The upper baffle portion 53 defines a first curved guide surface 53a opposed to the cutting chamber 20L not having the grass discharge opening 14, and a second curved guide surface 53b opposed to the cutting chamber 20R having the grass discharge opening 14. The first curved guide surface 53a is curved for guiding grass clippings to circulate along the circumference of the rotation region 13LA in the cutting chamber 20L, and to descend from upper part to lower part of the cutting chamber 20L. The second curved guide surface 53b is curved for guiding grass clippings to circulate along the circumference of the rotation region 13RA in the cutting chamber 20R, and to descend from upper part to lower part of the cutting chamber 20R. The upper baffle portion 53 has a forward end 53c thereof protruding deeper inward in the fore and aft direction of the blade housing 11 than a forward end 54c of the lower baffle portion 54.

The lower baffle portion 54 defines a first curved guide surface 54a opposed to the cutting chamber 20L not having the grass discharge opening 14, and a second curved guide surface 54b opposed to the cutting chamber 20R having the grass discharge opening 14. The first curved guide surface 54a is curved for guiding winds from the rotary cutting blade 13L to circulate in the cutting chamber 20L. The second curved guide surface 54b is curved for guiding winds from the rotary cutting blade 13R to circulate in the cutting chamber 20R.

The air passage 55 is defined by a connecting portion 56 connecting the lower baffle portion 54 and upper baffle portion 53 of the rear baffle 50, Winds generated by the wind-generating vanes 25 of the rotary cutting blade 13L produce winds that pass along a lateral surface 56a of the connecting portion 56 between the lower baffle portion 54 and upper baffle portion 53, and enter the cutting chamber 20R to join the winds from the rotary cutting blade 13R. The lateral surface 56a guides the winds from the rotary cutting blade 13L to flow in a direction easy to enter the cutting chamber 20R.

Figure 7:
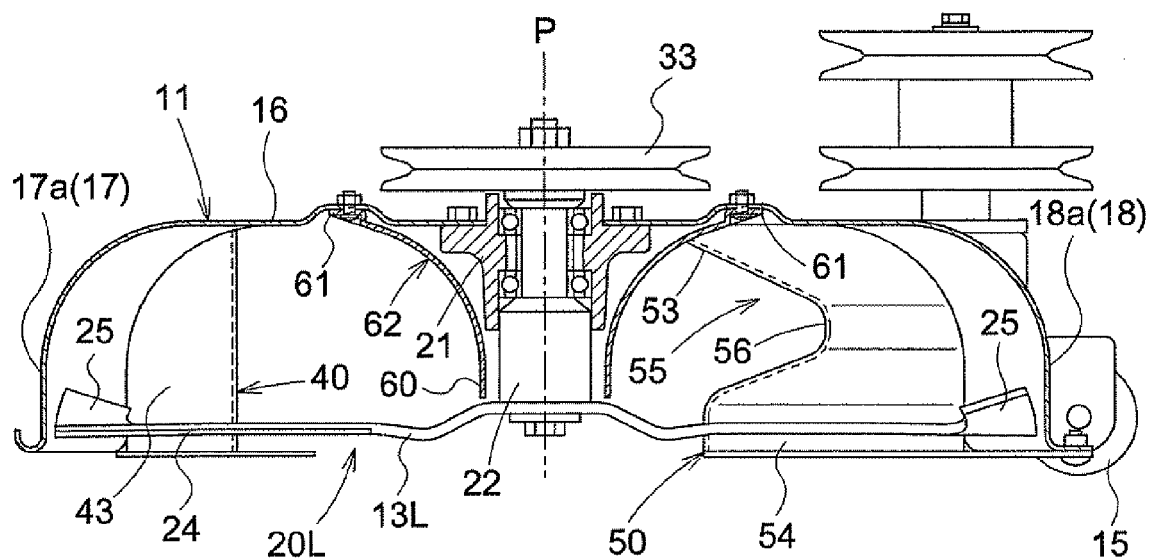
FIG. 7 is a side view in vertical section of the mower unit.

As shown in FIGS. 6 and 7, the blade housing 11 has a holder cover 60 covering each bearing holder 21. The holder cover 60 is formed cylindrical to cover each bearing holder 21 throughout the circumference thereof, and is bolted to the top board 16 through a connecting flange portion 61 formed at the upper end of the holder cover 60. The holder cover 60 has a concave curved guide surface 62 continuous with the connecting flange portion 61. The curved guide surface 62 guides grass clippings cut by the rotary cutting blade 13L or 13R, ascending to upper areas in the cutting chamber 20L or 20R, and flowing toward the axis P, to flow down along the holder cover 60 and fall to the central part of the cutting chamber 20L or 20R.

That is, the mower unit 10 has the output of the engine 7 inputted to the blade drive mechanism 30 through the transmission belt 8, The blade drive mechanism 30 drives one rotary cutting blade 13L to rotate in the direction A about the axis P, and the other rotary cutting blade 13R to rotate in the direction B about the axis P, to cut grass with the cutting edges 24 of the rotary cutting blades 13L and 13R. Grass about to enter the overlap region 23 is pushed by the pressing surface 43b of one side portion 43 of the front baffle 40 away from the overlap region 23 toward the lateral end of the blade housing 11. The bottom plate 46 presses down the grass having passed the one side portion 43 to maintain the grass in a prostrate state to which the grass has been pressed by the one side portion 43. In this way, a grass cutting operation is carried out while inhibiting entry of the grass to the overlap region 23. During this grass cutting operation, winds are generated by the wind-generating vanes 25 of the rotary cutting blades 13L and 13R.

When the grass discharge opening 14 is open, the winds generated by the rotary cutting blade 13R flow to the grass discharge opening 14 under the guiding action of the rear arc wall portion 18a, the second curved guide surface 54b of the lower baffle portion 54 of the rear baffle 50, the other side portion 44 of the front baffle 40, and the front curved wall portion 17a. The winds generated by the rotary cutting blade 13L flow through the air passage 55 of the rear baffle 50 into the cutting chamber 20R to join the winds from the rotary cutting blade 13R and flow to the grass discharge opening 14. The winds from the rotary cutting blades 13L and 13R transport grass clippings from the rotary cutting blades 13L and 13R to the grass discharge opening 14, and discharge the grass clippings from the grass discharge opening 14 to areas laterally outward of the mower unit 10. This constitutes a side discharge operation.

When the grass discharge opening 14 is closed by the lid 26, the winds generated by the rotary cutting blade 13L circulate in the cutting chamber 20L under the guiding action of the one side portion 43 of the front baffle 40, the front curved wall portion 17a, the side wall 19, the rear arc wall portion 18a, and the lower baffle portion 54 of the rear baffle 50. These winds and the guiding action of the first curved guide surface 54a of the upper baffle portion 53 of the rear baffle 50 cause grass clippings to circulate in the cutting chamber 20L to undergo easily the cutting action of the rotary cutting blade 13L. Thus, the rotary cutting blade 13L shreds the grass clippings. On the other hand, the winds generated by the rotary cutting blade 13R circulate in the cutting chamber 20R under the guiding action of the other side portion 44 of the front baffle 40, the front curved wall portion 17a, the inner surface of the lid 16, the rear arc wall portion 18a, and the second curved guide surface 54b of the lower baffle portion 54 of the rear baffle 50. These winds and the guiding action of the second curved guide surface 53b of the upper baffle portion 53 of the rear baffle 50 cause grass clippings to circulate in the cutting chamber 20R to undergo easily the cutting action of the rotary cutting blade 13R. Thus, the rotary cutting blade 13R shreds the grass clippings. Thus, the grass cut by the rotary cutting blades 13L and 13R are shredded by the rotary cutting blades 13L and 13R, and are discharged from the bottoms of the cutting chambers 20L and 20TR of the blade housing 11 to areas under the mower unit 10. This constitutes a mulching operation.

Figure 13:
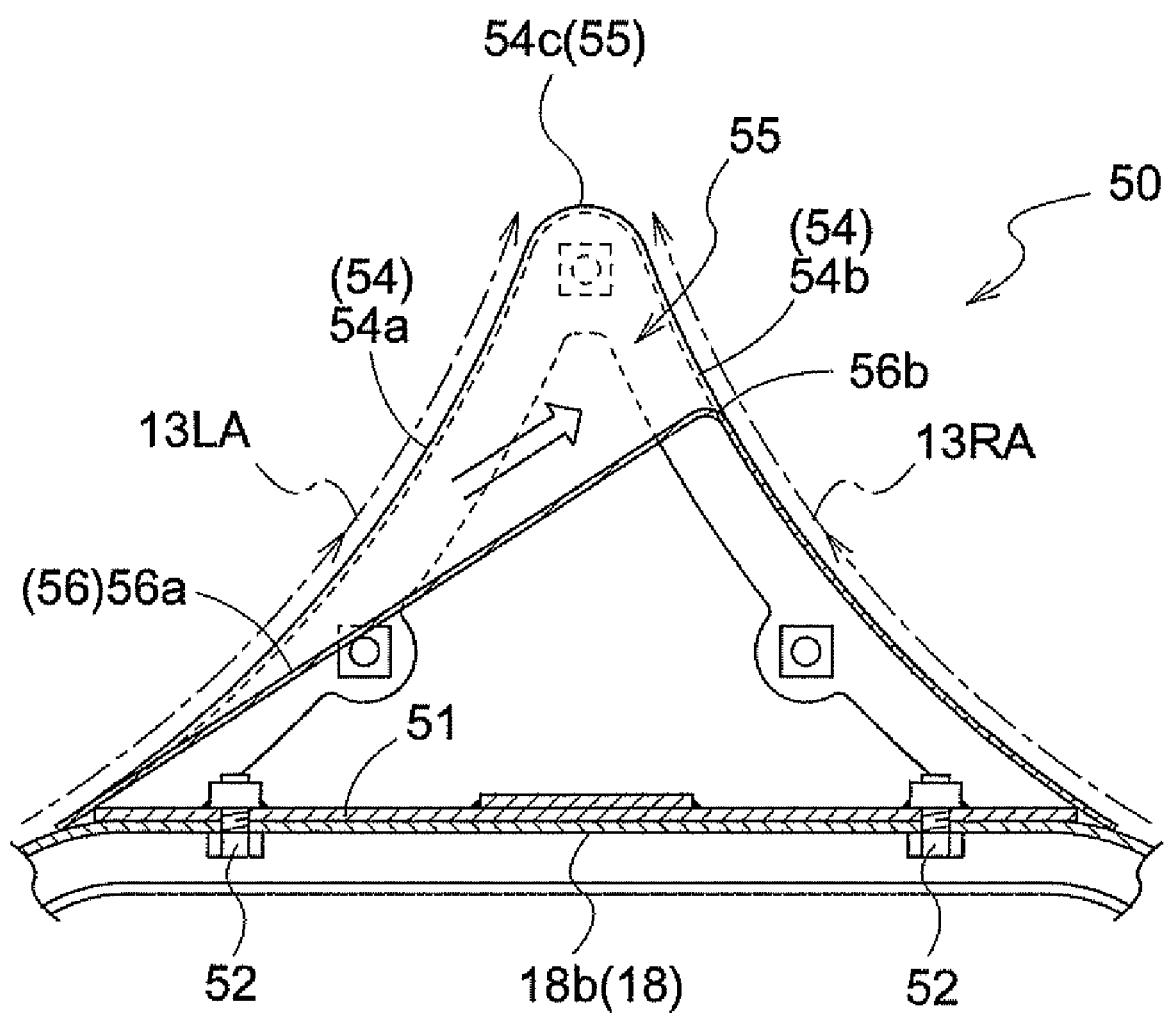
FIG. 13 is a plan view in cross section a rear baffle in a second embodiment.

FIG. 13 is a plan view in cross section of a rear baffle 50 having a construction in the second embodiment. As seen, the rear baffle 50 in the second embodiment is the same as the rear baffle 50 in the preceding embodiment in respect of the lower baffle portion 54 and upper baffle portion 53, but has a different construction of the air passage 55.

In the air passage 55 of the rear baffle 50 in the second embodiment, the connecting portion 56 has a tip 56b thereof located on a line linking the second curved guide surface 54b of the lower baffle portion 54 and the second curved guide surface 53b of the upper baffle portion 53.

OTHER EMBODIMENTS

This invention is applicable not only to a mower unit having two rotary cutting blades 13L and 13R as in the foregoing embodiments, but also to a mower unit having three or more rotary cutting blade. In this case, a pair of adjoining rotary cutting blades among the plurality of rotary cutting blades correspond to the pair of rotary cutting blades in this invention.

The invention is applicable also to a mower unit in which the rear baffle 50 is replaced with the front baffle disposed forwardly of the pair of rotary cutting blades 13L and 13R. Thus, these rear baffle 50 and front baffle are collectively called baffle 50.

What is claimed is:

1. A mower unit comprising:
   a housing;
   a pair of cutting blades arranged inside said housing, each of the cutting blades being rotatable about a respective vertical axis supported by said housing, said pair of cutting blades being driven to be rotated in opposite directions;
   a baffle arranged generally between rotation regions of said pair of cutting blades to guide air flows generated by said pair of cutting blades, said baffle having an upper baffle portion located adjacent an upper region of said housing, a lower baffle portion located adjacent a lower region of said housing, and a vertically intermediate region between the upper baffle portion and the lower baffle portion, and said baffle defining an air passage for allowing the air flows to flow between said upper baffle portion and said lower baffle portion;

wherein the upper baffle portion has a region that is continuous from the vertically intermediate region and whose cross section in a side sectional view extends upwardly in a forward direction and the lower baffle portion has a region that is continuous from the vertically intermediate region and whose cross section in the side sectional view extends downwardly in a forward direction; and wherein said baffle is in contact with a rear wall of the housing.

2. A mower unit as defined in claim 1, wherein said housing has a grass discharge opening that is adapted to be opened and closed and that is formed in a lateral end region thereof.

3. A mower unit as defined in claim 1, wherein said region of said upper baffle portion whose cross section in a side sectional view extends upwardly in a forward direction has a linear cross section.

4. A mower unit as defined in claim 1, wherein said pair of cutting blades are supported by said housing such that one of said cutting blades is located forwardly of the other.

5. A mower unit as defined in claim 1, wherein said lower baffle portion has a portion whose cross section in a side cross sectional view extends straight and upwardly.

6. A mower unit as defined in claim 1, wherein said baffle has a laterally intermediate region and a left side portion and a right side portion, and wherein the left side portion has a cross section taken in a horizontal plane that extends forward toward the laterally intermediate region and the right side portion has a cross section taken in the horizontal plane that extends forward toward the laterally intermediate region.

7. A mower unit as defined in claim 6, wherein the vertically intermediate region and the laterally intermediate region intersect each other in an intersecting region that includes a portion that is located most rearwardly in the baffle in the side sectional view and that is located most forwardly in the baffle in the sectional view taken at the horizontal plane.

* * * * *